Patented Feb. 4, 1941

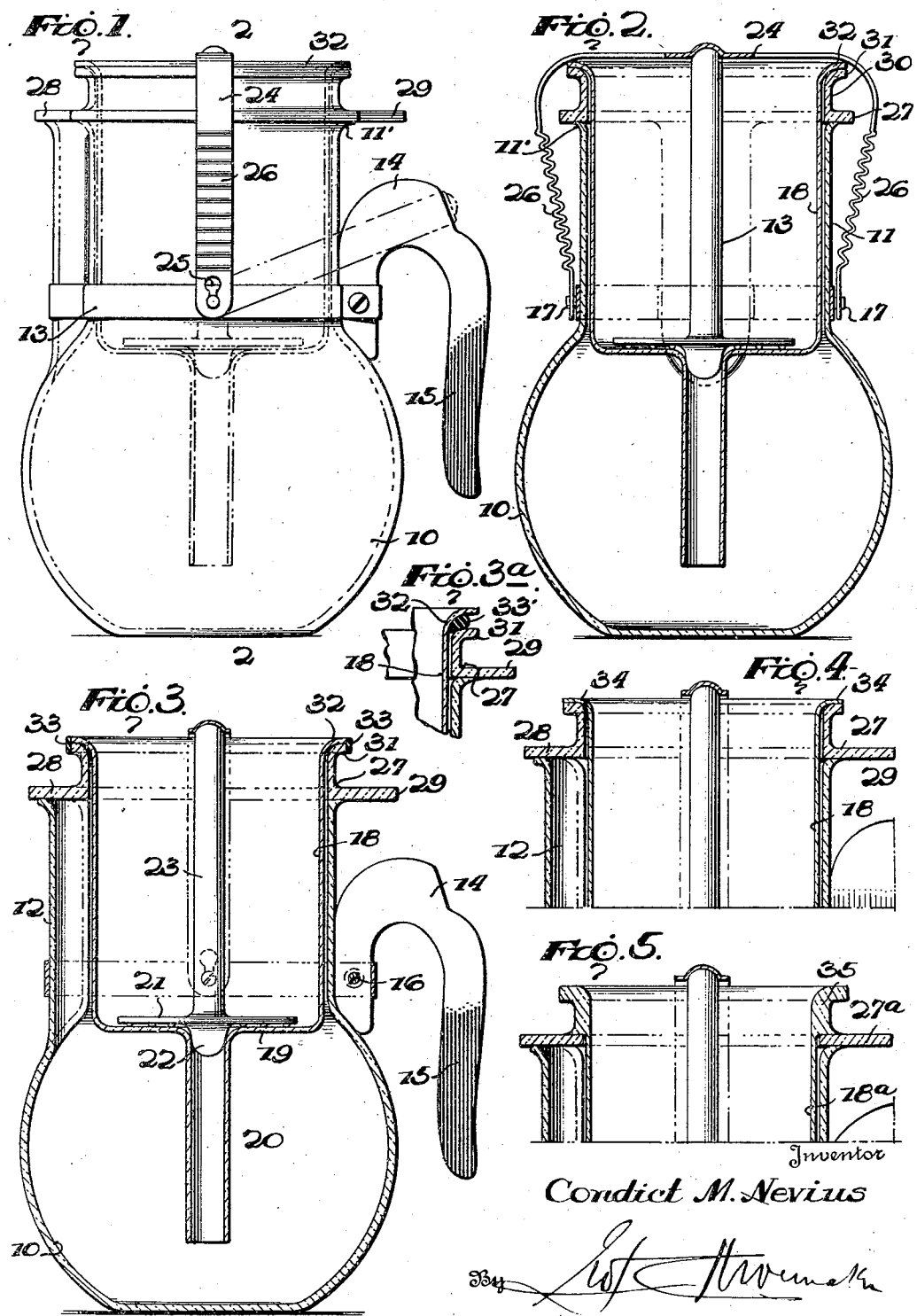

2,230,901

UNITED STATES PATENT OFFICE 2,230,901

COFFEE BREWING DEVICE

Condict M. Nevius, Rochester, N. Y.

Application January 3, 1939, Serial No. 249,095

4 Claims. (Cl. 53—3)

The present invention relates to coffee brewing devices of the steam, vacuum type and of the general characteristics described and claimed in my co-pending application filed December 28, 1936, under Serial No. 117,928, in which upper and lower receptacles are associated with a means forming a seal therebetween for the upper edge of the lower receptacle and with the pouring means of the lower receptacle during the brewing operation, the sealing means being movable while in sealing contact with the lower receptacle to uncover the pouring means, so that, with or without holding means for holding the upper receptacle and the sealing means against accidental displacement relative to the lower receptacle, the two receptacles may be tilted as a unit to pour from the lower receptacle after the brewing operation has been completed. Such a coffee brewing device is also characterized by a tubular member which depends in the lower receptacle and which is effective in the heat controlled transfer of fluid to and fro between the upper and lower receptacles.

More particularly, the present invention, though dealing with a coffee brewing device of the above characteristics, proposes a specifically improved structural form and arrangement to enable, as a primary object thereof, the practical manufacture of the same of glass, that is, glass of a low coefficient of expansion, such, for instance, as commonly known as heat-resistant glass.

A further object of the invention is the provision of a coffee brewing device which when so made will be capable of ready, easy handling, which may be maintained at all times in a cleanly, highly sanitary condition, with minimum effort, and which will produce a natural, untainted brew conserving all of the flavor and essence of the coffee berry.

With the above general objects in mind, the present invention may be better understood and more thoroughly appreciated in the course of the following detailed description of the construction, arrangement and operation of its various parts, and by reference to the accompanying drawing which forms a part of this specification, and in which Figure 1 is a side elevation of the improved coffee brewing device.

Figure 2 is a central vertical sectional view taken therethrough substantially on the line 2—2 of Figure 1.

Figure 3 is a central vertical sectional view taken therethrough at right angles to the section of Figure 2 and showing a slightly modified construction.

Figure 3ᵃ is a fragmentary detail view showing a modified arrangement of the sealing ring between the cooperating flange portions of the intermediate sealing member and the top of the coffee receptacle.

Figure 4 is a detail vertical sectional view through the upper portion of the device, illustrating a modified construction, and Figure 5 is a similar view to Figure 4, illustrating another slight modification.

In my above-mentioned application, various specific forms of construction were outlined, all, however, involving the use of an upper coffee holding receptacle located above the sealing member between such receptacle and the lower fluid receptacle, with the result that when pouring from the complete device, after a brewing operation, the upper receptacle is substantially above the pouring spout or means.

According to the present invention, the upper coffee receptacle depends within the lower fluid receptacle through the sealing means and is either engaged or made integral at its upper portion with the sealing member, so that it need project but slightly above the pouring spout or means when the device is manipulated as a unit to pour from the lower receptacle after the brewing operation.

Thus, in the present instance, I have shown the fluid receptacle as having a lower bowl-like fluid holding portion 10 and an upstanding tubular portion or neck 11 provided with a pouring spout 12 formed in the wall thereof so that it communicates at its lower end with the lower fluid holder 10 and opens at its upper end flush with the upper flared edge 11' of the neck or upstanding cylindrical portion 11, whereby the upper edges of the latter and the pouring spout or other means 12 may be simultaneously ground to promote sealing contact with the sealing member to be hereinafter further described.

Around the lower receptacle, and preferably positioned around the lower portion of the upstanding cylindrical part 11, is fixedly positioned a supporting band 13, a portion of which embraces the lower part of the pouring spout 12, and a diametrically opposite portion of which serves as an anchor for a handle 14 approximately of inverted U-shape with its longer outer arm depending to provide a grasping portion 15 and with its inner portion shaped to conform to the contour between and along the adjacent portions of the cylindrical part 11 and the lower bowl-like fluid holder 10 of the lower receptacle, this part of the handle being secured to an offset portion of the band 13 by a transversely disposed connecting bolt or fastening member 16. At diametrically opposite points, preferably midway between its handle and pouring spout embracing portions, the band 13 is provided with rigid outstanding studs 17 for a purpose which will presently appear.

The upper coffee receptacle is, generally speaking, of the cylindrical form shown at 18 and of a diameter less than the inside diameter of the cylindrical upstanding part or neck 11 of the lower receptacle. The upper receptacle, which is thus adapted to depend within the lower receptacle, has its bottom 19 provided centrally thereof with a depending stem in the form of a hollow tube 20, which opens at its upper end into the upper receptacle and which opens at its lower end within the fluid holder of the lower receptacle at a point substantially above the base of the latter.

With the upper receptacle, a filter generally indicated at 21 is utilized, and this filter seats on the bottom 19, preferably with a guiding protuberance 22 upon its lower face depending slightly within the fluid channel forming stem 20. This filter which prevents the ground coffee from dropping from the upper receptacle 18 into the lower receptacle 10, while permitting the free transfer of fluid between the receptacles, has an upstanding rod or stem 23 projecting vertically and axially through the upper receptacle to a point slightly above the upper edge of the latter, in order that it may be engaged by the central portion of a holding or clamping member shown in the form of a strip 24 of any suitable material, the ends of which are preferably provided with key-hole slots 25 effectively engaging the headed studs 17 of the supporting band 13. The side portions of this strip are also preferably formed to provide for lengthwise extension or elasticity and may for this purpose be corrugated as indicated at 26.

The sealing member is preferably in the form of a flat circular strip 27 centrally apertured to surround the upper receptacle 18 and having its lower surface ground to form a fluid-tight joint with the upper ground edge of the lower receptacle. This sealing member is provided at diametrically opposite points with slight protuberances or extensions 28 and 29, the latter of which is positioned in use above the handle 14 and the former of which, during the brewing operation, overlies and closes in fluid-tight relation the upper open end of the spout or pouring means 12 of the lower receptacle and is, for this purpose, provided with a ground lower surface the same as that of the body of the sealing member, it being understood that, by grasping the finger piece or projection 29 above the handle, the sealing member may be shifted rotatably to displace its spout covering portion 28 so as to uncover the upper end of the pouring spout or other means 12, permitting pouring from the lower receptacle after the brewing operation.

According to the form of the invention shown in Figures 1 to 4, inclusive, the sealing plate or ring 27 has a short upstanding neck portion 30 provided with an upper outwardly flaring edge 31 and the upper coffee receptacle 18 has an outwardly flaring upper edge 32.

As seen in Figures 1, 2 and 3, in the assembled position of the parts, the flaring upper edge 32 of the upper receptacle 18 seats on the flaring upper edge 31 of the sealing ring 27, pressure of the holder 24 through stem 23 of the filter member 21 downwardly upon the upper receptacle serving to hold the thus engaging flaring edges 32 and 31 in snug contact. The adjacent faces of these flaring edges 32 and 31 may be ground to form a fluid-tight contact joint, as contemplated in Figures 1 and 2, and, whether plain or ground for this purpose, these contacting edge portions 32 and 31 may be sealed by a sealing ring 33 and 33' as shown in Figure 3 and Figure 3ª respectively. On the other hand, the flared upper portions of the inner receptacle and the sealing member may be welded or fused together at 34 in Figure 4, where the upper receptacle 18 and the sealing ring 27 thus become in effect a single piece and the general unit becomes a two-piece rather than a three-piece construction. In other words, leaving out of consideration the handle, holding means and filter, the unit embodies but two parts, namely, the outer receptacle constituting one piece, and the permanently jointed sealing member and upper receptacle constituting the other part. It is furthermore possible that instead of providing the sealing member with an upstanding neck portion, the inner receptacle, such as shown at 18ª in Figure 5, may have a substantially thickened upper portion above the sealing ring 27ª. This thickened portion is indicated at 35 and provides an annular shoulder to seat on the sealing ring 27ª so that, if a three-piece unit is desirable, the engaging faces of ring 27ª and the shoulder of the upper receptacle may be ground to form a fluid-tight joint like the engaging surfaces of the sealing ring and the upper edge of the lower receptacle. Similarly, if a two-piece construction is preferred, it is obvious the surface of the shoulder of the upper portion 35 of the upper receptacle 18ª in Figure 5 may be fused or welded to the upper inner portion of the sealing ring 27ª or in fact the upper portion 35 may be formed integral with the sealing member 27ª.

The operation of all of the above-described forms is the same, the upper receptacle, after assembly of the parts, receiving the ground coffee and holding the same above the fluid holder of the lower receptacle until, upon the application of heat, the fluid in the lower receptacle boils and, due to the increased pressure, passes upwardly through the tubular channel 20 into the upper receptacle. During this, the brewing operation, the sealing member maintains a fluid-tight seal at the upper edge of the lower receptacle and also across the mouth of the spout or pouring means of the latter receptacle.

When, upon reduction of heat, the fluid falls again into the fluid holder of the lower receptacle, the sealing means may be rotatably shifted to uncover the pouring means or, in other words, the upper end of the pouring spout 12, and, since the several parts are maintained against displacement by the holding means 24, the brewed fluid may be poured from the lower receptacle by tilting the several parts as a unit with the aid of the handle 14.

This construction particularly lends itself to the use of heat-resistant glass, and it is obvious that with the use of such a material it is not only an easy matter to maintain the several parts in a cleanly, sanitary condition at all times, but it is assured that without metal coming in contact with the brew at any time the latter will embody the full, natural flavor of the coffee employed.

It will be understood that the sealing member 27 may be eliminated, if desired, and that in such an event the flange 32 at the top of the upper receptacle 18 would have a ground surface on the under side and seat directly upon the ground upper edge of the lower receptacle. In such an arrangement, the flange 32 would be preferably extended laterally slightly circumferentially in a horizontal direction to present a flat ground face for engagement with the upper ground edge of the lower receptacle after the fashion of the engagement of the sealing ring 27 with the ground face at the upper edge of the lower receptacle. The slight horizontal extension of the flanges of the receptacles permits slight lateral movement of the upper receptacle within the lower receptacle without breaking the seal between the two receptacles incident to relative lateral movement of the receptacles.

It will also be understood that under certain conditions, the device is operable without the holding means illustrated and described as well as with the same. Assume that surface water level while brewing is six inches lower in the coffee or water receptacle than in the upper brewing receptacle. There is a hydrostatic difference of approximately one-sixtieth of atmospheric pressure, or about one-quarter pound per square inch. Assume a four-square-inch area for the top of the coffee receptacle. This would mean a lifting effect of about one pound under the brewing or upper receptacle. Therefore, if the brewing receptacle weighs more than one pound, it will not be lifted from sealing position. As a matter of fact, considering weight of contents, it could weigh less than one pound and still maintain a seal. In such case, gravity is the holding means.

What is claimed is:

1. A steam vacuum coffee brewing device comprising a fluid receptacle having an upper cylindrical neck portion terminating in an upper open top and having a pouring means open at said top, a coffee receptacle depending through said neck portion and in communication at its bottom with the fluid receptacle for the transfer of fluid under pressure control to and fro between said receptacles, a sealing member disposed and extending around the open top of the fluid receptacle and embracing the upper part of the cylindrical neck portion of the fluid receptacle and shiftable while in sealing contact therewith to cover and uncover the pouring means, said sealing member and the upper portion of the coffee receptacle having outwardly flared overlapping edge portions, a sealing ring engaging said overlapping portions, and means for normally holding the two receptacles and said sealing member against accidental displacement relative to one another.

2. A steam vacuum coffee brewing device comprising a fluid receptacle open at its top and having an outwardly flared edge thereat and also having a pouring means, a coffee receptacle mounted in the fluid receptacle and at its upper end having an outwardly flared edge, and an annular member interposed between said receptacles and having spaced upper and lower outwardly directed flanges, the lower flange thereof being movably disposed on the upper edge of the fluid receptacle and extending over the mouth of the pouring means and having shiftable sealing contact with the upper edge of the fluid receptacle and with the mouth of the pouring means, the upper edge of the coffee receptacle overhanging the upper flange of the annular member.

3. A steam vacuum coffee brewing device comprising a fluid receptacle open at its top and provided with an outwardly directed flange at the upper edge thereof and also having a pouring means, a coffee receptacle mounted in the fluid receptacle and having an outwardly directed flange at its upper edge, and an annular member embracing the upper portion of the coffee receptacle and having spaced upper and lower outwardly directed flanges, the lower flange being movably disposed on the upper flanged edge of the fluid receptacle and extending over the mouth of the pouring means and having shiftable sealing contact with the upper edge of the fluid receptacle and the mouth of the pouring means, the upper flanged edge of the coffee receptacle overhanging the flange of the annular member.

4. A steam vacuum coffee brewing device comprising a fluid receptacle open at its top and having an outwardly flared edge thereat and also having a pouring means, a coffee receptacle mounted in the fluid receptacle, and a cylindrical member interposed between said receptacles and surrounding the upper portion of the coffee receptacle and having a lower outwardly directed flange movably disposed on the upper edge of the fluid receptacle and extending over the mouth of the pouring means and having shiftable sealing contact with the upper edge of the fluid receptacle and the mouth of the pouring means, and sealing means between the upper portion of the cylindrical member and the upper portion of the coffee receptacle.

CONDICT M. NEVIUS.

CERTIFICATE OF CORRECTION.

Patent No. 2,230,901. February 4, 1941.

CONDICT M. NEVIUS.

It is hereby certified that error appears in the printed specification of the above numbered patent requiring correction as follows: Page 3, first column, line 50, claim 1, after the word "disposed" insert --on--; and that the said Letters Patent should be read with this correction therein that the same may conform to the record of the case in the Patent Office.

Signed and sealed this 4th day of March, A. D. 1941.

(Seal)

Henry Van Arsdale,
Acting Commissioner of Patents.